March 27, 1934.   W. W. KELCH   1,952,713
SPRING MOTOR
Filed Oct. 6, 1931
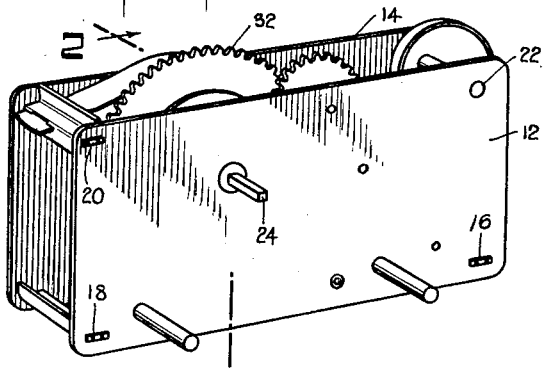
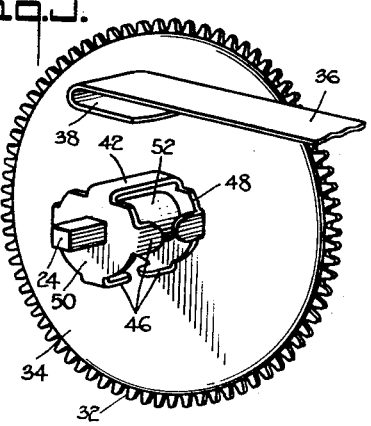
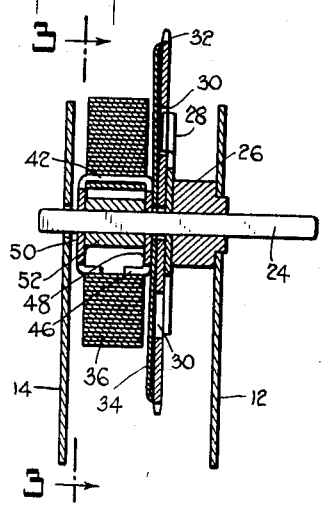
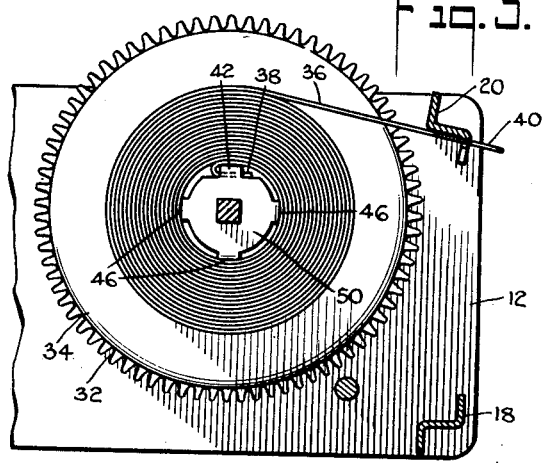
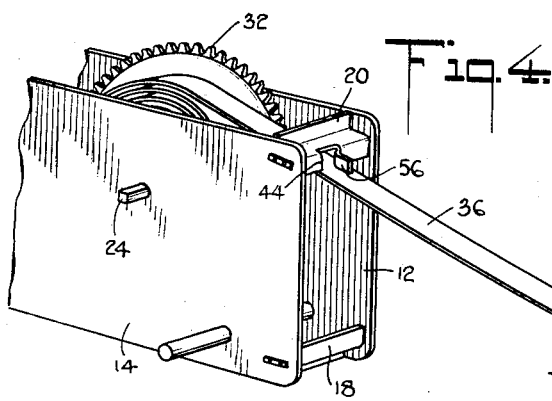
INVENTOR
Wilbur W. Kelch
BY
ATTORNEYS Patented Mar. 27, 1934

1,952,713

UNITED STATES PATENT OFFICE 1,952,713

SPRING MOTOR

Wilbur W. Kelch, Girard, Pa., assignor to The Girard Model Works Inc., Girard, Pa., a corporation of Pennsylvania Application October 6, 1931, Serial No. 567,173

6 Claims. (Cl. 185—45)

This invention relates to spring motors, and more particularly to spring motors employing a spirally wound spring such as is commonly used for the propulsion of toys and the like.

In spring motors it is customary to secure one end of a flat or ribbon-like spring to a main shaft or winding stem, so that unwinding of the spring causes rotation of the shaft or stem. The space taken by the securing means attaching the spring to the stem, or/and the rigidity of the end of the spring affixed to the stem, result in the spirally wound spring assuming an eccentric rather than concentric relation to the stem. This in turn greatly increases the friction between the convolutions of the spring during the unwinding operation, thereby decreasing the torque and effective energy output of the motor. One object of the present invention is to overcome the foregoing difficulty, which I do by providing the shaft or stem not only with means for receiving and holding the end of the spring, but also with additional means for so spacing the first convolution of the driving spring from the shaft that the spring is necessarily wound in substantially concentric relation to the shaft. More specifically, I preferably employ and mount on the shaft a clip comprising a piece of heavy sheet metal shaped and bent to form spaced ends interconnected by transverse members, the latter extending generally parallel to the shaft. The end of the spring is bent in the form of a hook, and one of the aforesaid transverse members is adapted to receive this hook. The other of the transverse members serve to properly space the first convolution of the driving spring from the shaft, so that the spring is wound in concentric relation thereto.

Another object of the present invention centers about the provision of simple and inexpensive means for receiving and anchoring or holding the outer or free end of the spring. Still another object of the present invention resides in a method and means for spirally winding the spring from a flat condition directly into the spring motor itself, it being understood that so far as I am aware, it has heretofore been necessary and the common practice to preliminarily wind the spring into a spiral or coil, to thereafter slip a heavy wire or clamp over the coil to hold it in spiral formation, to then assemble or mount the spirally wound spring into the works of the motor, and to finally release and remove the clamp. In accordance with my invention, the inner end of the spring is bent to form a hook, and the winding stem is provided with means for freely receiving the said hook, all as previously described. The other or outer end of the spring is notched to form a T, and the frame of the spring motor includes a transverse member provided with a slot cut on that side toward which the outer end of the spring tends to unwind, the said slot being appropriately dimensioned to freely receive the notched or narrowed portion of the T-shaped end of the spring. With this construction it will readily be apparent that the spring may be wound from a flat condition by simply hooking the inner end of the spring onto the winding stem and permitting the remainder of the spring to extend out of the frame near the aforesaid slotted member. The winding stem is then turned in order to wind the spring into the desired formation, the unwound portion of the spring being prevented from revolving by the aforesaid transverse member. At the end of the winding operation, the notched or T-shaped end of the spring naturally tends and is permitted to slip into the slot or recess on the transverse member, thereby completing the operation.

To the accomplishment of the foregoing and such other objects as may hereinafter appear, my invention resides in the spring motor elements and their relation one to the other, as hereinafter are more particularly described in the specification and sought to be defined in the claims. The specification is accompanied by a drawing in which:

Fig. 1 is a perspective view of a typical spring motor embodying my invention;

Fig. 2 is a section taken in the plane of the lines 2—2 in Fig. 1;

Fig. 3 is a section taken in the plane of the lines 3—3 in Fig. 2;

Fig. 4 is a perspective view illustrating the method of spirally winding the spring from a flat condition directly into the motor; and Fig. 5 is a perspective view of a preferred form of spring clip or fitting for receiving the inner end of the spring.

Referring to the drawing, the spring motor comprises a frame including side plates 12 and 14 which are rigidly held in spaced relation by transverse spacer members 16, 18, 20, and 22. The side plates 12 and 14 are appropriately apertured to provide bearings for a combined main shaft and winding stem 24 and for the various shafts and spindles of the gear train of the motor works. The winding stem 24 is preferably square in cross-section and has fixed thereon a bushing 26 to which is secured the driving portion 28 of a ratchet mechanism the driven portion 30 of which consists of a series of slots cut in the face of a main driving gear 32. The opposite side of the main driving gear 32 is preferably faced with a smooth disc 34 which acts as a protective surface for the side edges of the convolutions of the spring 36.

The spring 36 consists of a flat or ribbon-like strip of tempered steel or similar resilient material. The inner end is bent to form an open hook 38, as is best shown in Fig. 5. The outer end is notched to form a T, 40, best shown in Fig. 4. The inner end 38 is anchored on appropriate holding means 42 secured to the winding stem 24, while the outer end 40 is received and held by a fixed part of the frame, preferably a slot or recess 44 cut in one side of the transverse spacer member 20.

By referring to Fig. 5, it will be readily apparent that the hook 38 and holding means 42 result in the inner end of the spring being spaced from stem 24. If used alone, as in the prior art, this, or, in fact, any other form of holding or attaching means will cause the spring to be eccentrically wound about the stem. In accordance with the present invention, additional means 46 are provided for so spacing the first convolution of the spring 36 from the stem 24 that the spring is wound in substantially concentric relation to the stem. The means 46 preferably take the form of bent lugs, as shown, which extend generally parallel to the axis of the stem and are spaced further therefrom than the bar 42 in order to allow for the space taken by the hook 38. The resulting accurately centered relation of the spring to the shaft or stem 24 is clearly evident from an inspection of Fig. 3. Except for the fact that the convolutions of the spring are spiral instead of truly circular, it may be stated that these convolutions are brought into exact concentricity with the axis of the stem. The coil thereby obtained unwinds in a free and substantially frictionless manner which permits of optimum utilization of the energy stored therein.

In actual practice, the holding means 42 and the spacing means 46 are preferably all formed of a single piece of heavy sheet metal which is shaped and bent to form ends 48 and 50 received by stem 24 and spaced apart by an amount slightly greater than the width of spring 36. The complete member acts as a clip and includes the transverse bar 42 for receiving the hook 38, and the transverse lugs 46 for properly locating spring 36 with relation to stem 24. A bushing 52 may be and preferably is provided between the ends 48 and 50 of the clip in order to make the assembly rigid and strong.

The transverse spacer members 16, 18, and 20 preferably consist of heavy sheet metal which is stepped in cross-section, as is clearly evident from an inspection of the drawing, particularly Fig. 3. The intermediate portions are allowed to project at the ends of the cross members and are passed through mating slots in side plates 12 and 14, after which the projecting ends are expanded or riveted to securely lock the spacer members and side plates together. One of the spacer members, preferably the member 20 which is located nearest to the coiled spring, is additionally employed for holding the free end 40 of the spring, and this is most simply accomplished, as was previously mentioned, by providing the transverse member 20 with a slot or recess 44 dimensioned to receive the neck or narrowed portion of the T-shaped end 40 of the spring. It should be particularly noted that this slot or recess is preferably provided at the under side of member 20, or, more generally, on that side toward which the free end 40 of spring 36 tends to unwind. This construction is simple, yet effective, because the tension of the spring itself tends to constantly urge the free end 40 into holding relation with the frame.

The construction here described possesses a further and very important advantage in permitting the spring to be spirally wound from its flat condition directly into the works of the spring motor. In the past, it has been necessary to preliminarily coil the spring and to thereafter clamp the same in wound condition. Only when in this clamped condition could the spring be applied to the works of the motor and placed within the motor frame. After locking the spring in place, the clamp had to be released and withdrawn from the spring. In accordance with my invention, it is simply necessary to take the inner or hooked end 38 of the spring 36, and pass it into one end of the frame between transverse members 18 and 20, after which the hook 38 is slipped over the clip bar 42, by which it is, of course, very freely received. The winding stem 24 is thereupon wound with an appropriate key or by power driven mechanism, in order to wind up the spring. The main body or trailing portion of the straight spring tends to revolve with the winding stem, but is restrained from so doing by transverse member 20. This winding operation is simply continued until the T-shaped end 40 of the spring reaches the slot or recess 44, at which time it tends of itself to slip into the recess. If it happens to be out of alignment, it is, of course, readily guided into place.

There is no tendency for the spring to escape, but, if desired, an extra precaution may be taken by finally bending the tab 56, (see Fig. 4) formed when making the slot 44, back into alignment with the remainder of the surface of the transverse member 20. With this precaution, the narrowed or necked part of the T-shaped end 40 of the spring is completely enclosed by transverse member 20 and cannot be moved out of position in any direction.

It is believed that the mode of constructing and assembling the spring motor elements of my invention, as well as the method of directly incorporating a flat spring into the motor frame, and the many advantages thereof, will, for the most part, be apparent from the foregoing detailed description. The inner end of the spring is readily applied and secured to the main shaft or winding stem in an exceedingly simple manner. The convolutions of the spring are kept in substantially concentric relation to the winding stem. The outer end of the spring is securely held by the motor frame without the provision of special parts and in such a manner that the spring tends to keep itself in locked relation. The spring may be taken in flat condition and easily and rapidly be coiled or wound onto the winding stem directly in place in the motor frame. In the event of breakage of the spring, it may be rapidly removed and replaced without disassembling the motor.

It will be apparent that while I have shown and described my invention in preferred form, many changes and modifications may be made in the structure disclosed, without departing from the spirit of the invention, defined in the following claims.

I claim:

1. In a spring motor, a spring having a hook-shaped end, a winding stem, and a clip on said stem comprising heavy sheet metal shaped and bent to form spaced ends interconnected by transverse members one of which receives the hook-shaped end of the driving spring, and the others of which space the first convolution of the driving spring from the winding stem, said transverse members being non-uniformly disposed relative to the winding stem in such a manner that the spring is wound in substantially concentric relation thereto.

2. In a spring motor for toys and the like, a spring having a hook-shaped end, a square winding stem, a main driving gear, ratchet means interconnecting the stem and the driving gear, and a fitting on said stem comprising a single piece of heavy sheet metal shaped and bent to form spaced ends interconnected by transverse members one of which receives the hook-shaped end of the driving spring, and the others of which space the first convolution of the driving spring from the winding stem, the first mentioned of said transverse members being spaced from the winding stem by an amount less than the others to compensate for the hook-shaped end of the spring, so that the spring is wound in substantially concentric relation to the winding stem.

3. A spring motor comprising a frame including a transverse member, a spirally wound spring the inner end of which is bent to form a hook and the outer end of which is notched to form a T, a winding stem, a clip on said stem comprising a piece of heavy sheet metal shaped and bent to form spaced ends interconnected by transverse members one of which receives the hook-shaped end of the driving spring and the others of which space the first convolution of the driving spring from the winding stem, said transverse members being so disposed relative to the winding stem that the spring is wound in substantially concentric relation thereto, and a slot cut on that side of the transverse member toward which the outer end of the spring tends to unwind, said slot being appropriately dimensioned to receive the notched or narrowed portion of the T-shaped end of the spring.

4. A spring motor for toys and the like, comprising a frame including side plates interconnected by transverse spacer members, a spirally wound spring the inner end of which is bent to form a hook and the outer end of which is notched to form a T, a winding stem extending between said side plates, a main gear mounted on said stem, ratchet means interconnecting the driving gear and the stem, a fitting on said stem comprising a piece of heavy sheet metal shaped and bent to form spaced ends interconnected by transverse members one of which receives the hook-shaped end of the driving spring and the others of which space the first convolution of the driving spring from the winding stem, said transverse members being so disposed relative to the winding stem that the spring is wound in substantially concentric relation thereto, and a slot cut on that side of one of the transverse spacer members toward which the outer end of the spring tends to unwind, said slot being appropriately dimensioned to receive the notched or narrowed portion of the T-shaped end of the spring.

5. A spring motor for toys and the like, comprising a frame including side plates interconnected by a transverse spacer member, an initially unwound flat spring strip the inner end of which is bent to form a hook and the outer end of which is inwardly notched or cut away to form a T, a winding stem extending between said side plates, means on said winding stem receiving the hook-shaped inner end of the spring, and an openable slot or recess cut on that side of the transverse spacer member toward which the body of the spring tends to unwind, said slot being located in alignment with the aforesaid means on the winding stem and being appropriately dimensioned to freely receive the notched or narrowed portion of the T-shaped end of the spring yet too small to receive the body of the spring, whereby the spring may readily be wound from a flat to a spiral condition directly in the motor.

6. A spring motor for toys and the like, comprising a frame including side plates interconnected by transverse spacer members, an initially unwound flat spring strip the outer end of which is inwardly notched or cut away to form a T, a winding stem extending between said side plates, means on said winding stem receiving the inner end of the spring, and a slot or recess cut on that side of one of the transverse spacer members toward which the body of the spring tends to unwind, said slot being defined by fixed side and top walls and a bendable lug acting as a bottom wall which is movable for opening or closing the slot, said slot being located in alignment with the aforesaid means on the winding stem and the side walls being appropriately spaced to freely receive the notched or narrowed portion of the T-shaped end of the spring yet too close to receive the body of the spring, whereby the spring may readily be wound from a flat to a spiral condition directly in the motor, and the slot closed upon the notched end of the spring to lock the same in place.

WILBUR W. KELCH.